US009917771B2

(12) United States Patent
Hooda et al.

(10) Patent No.: US 9,917,771 B2
(45) Date of Patent: Mar. 13, 2018

(54) VIRTUAL EXPANSION OF NETWORK FABRIC EDGE FOR MULTIHOMING OF LAYER-2 SWITCHES AND HOSTS (71) Applicant: Cisco Technology, Inc., San Jose, CA (US)

(72) Inventors: Sanjay Kumar Hooda, Cupertino, CA (US); Nalinaksh M. Pai, San Ramon, CA (US); Atri Indiresan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 14/820,636

(22) Filed: Aug. 7, 2015

(65) Prior Publication Data

US 2017/0041222 A1    Feb. 9, 2017

(51) Int. Cl.
| H04L 12/721 | (2013.01) |
| H04L 12/751 | (2013.01) |
| H04L 12/931 | (2013.01) |
| H04L 12/947 | (2013.01) |
| H04L 12/933 | (2013.01) |
| H04L 29/12 | (2006.01) |

(52) U.S. Cl.
CPC .............. H04L 45/66 (2013.01); H04L 45/02 (2013.01); H04L 49/15 (2013.01); H04L 49/25 (2013.01); H04L 61/2007 (2013.01)

(58) Field of Classification Search
None
See application file for complete search history.

(56) References Cited

U.S. PATENT DOCUMENTS

| 6,195,356 B1 * | 2/2001 | Anello ................. H04L 12/462 370/398 |
| 7,260,648 B2 * | 8/2007 | Tingley ............. H04L 29/12009 709/227 |
| 8,259,720 B2 * | 9/2012 | Farinacci ............... H04L 45/58 370/392 |
| 9,270,572 B2 * | 2/2016 | Koganti ................. H04L 45/02 |
| 9,397,881 B1 * | 7/2016 | Fritz ................... H04L 41/0663 |
| 2002/0181477 A1 * | 12/2002 | Mo ...................... H04L 12/4641 370/401 |
| 2002/0186698 A1 * | 12/2002 | Ceniza ................ H04L 12/4641 370/401 |
| 2003/0212781 A1 * | 11/2003 | Kaneda ............. H04L 29/12254 709/223 |
| 2012/0177054 A1 * | 7/2012 | Pati ..................... H04L 12/4625 370/395.53 |
| 2014/0056298 A1 * | 2/2014 | Vobbilisetty ............ H04L 12/46 370/355 |
| 2015/0195137 A1 * | 7/2015 | Kashyap ............. H04L 41/0893 370/254 |

(Continued)

Primary Examiner — Ayaz Sheikh
Assistant Examiner — Tarell Hampton
(74) Attorney, Agent, or Firm — Merchant & Gould P.C.

(57) ABSTRACT

Methods and systems are provided for virtual expansion of a fabric network edge to include edge network devices. For example, unique virtual Internet Protocol (IP) addresses may be assigned to a plurality of L2 switches, wherein the L2 switches are connected to one or more fabric edge devices in a fabric, and wherein the L2 switches are located outside of the fabric. Next, the unique virtual IP addresses may be announced in an underlay of the fabric.

16 Claims, 5 Drawing Sheets (56) References Cited

U.S. PATENT DOCUMENTS

2015/0333967 A1\* 11/2015 Addanki ................. H04L 41/12
370/392
2016/0191374 A1\* 6/2016 Singh ..................... H04L 41/00
370/228

\* cited by examiner

VIRTUAL EXPANSION OF NETWORK FABRIC EDGE FOR MULTIHOMING OF LAYER-2 SWITCHES AND HOSTS

TECHNICAL FIELD

The present disclosure relates generally to fabric based networks and specifically to the virtual expansion of a fabric network edge to include edge network devices.

BACKGROUND

One of the purposes of employing a fabric based network (such as Application Centric Infrastructure (ACI) fabric networks, campus-based fabric networks, and Virtual Extensible LAN (VxLAN) fabrics among others) is to make the fabric appear as a single network device to the network outside of the fabric. Prior fabric solutions do not provide for virtual fabric expansion to provide a more efficient representation of the fabric to the outside network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION OF EXAMPLE EMBODIMENTS

Overview

Methods and systems are provided for virtual expansion of a fabric network edge to include edge network devices. For example, unique virtual Internet Protocol (IP) addresses may be assigned to a plurality of L2 switches, wherein the L2 switches are connected to one or more fabric edge devices in a fabric, and wherein the L2 switches are located outside of the fabric. Next, the unique virtual IP addresses may be announced in an underlay of the fabric.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The first packet may be encapsulated at a first fabric edge device of the one or more fabric edge devices. For example, the first packet may be encapsulated with at least a unique virtual IP address assigned to a first L2 switch of the plurality of L2 switches. The first L2 switch and the first fabric edge device may be connected over a network interface.

Figure 1:
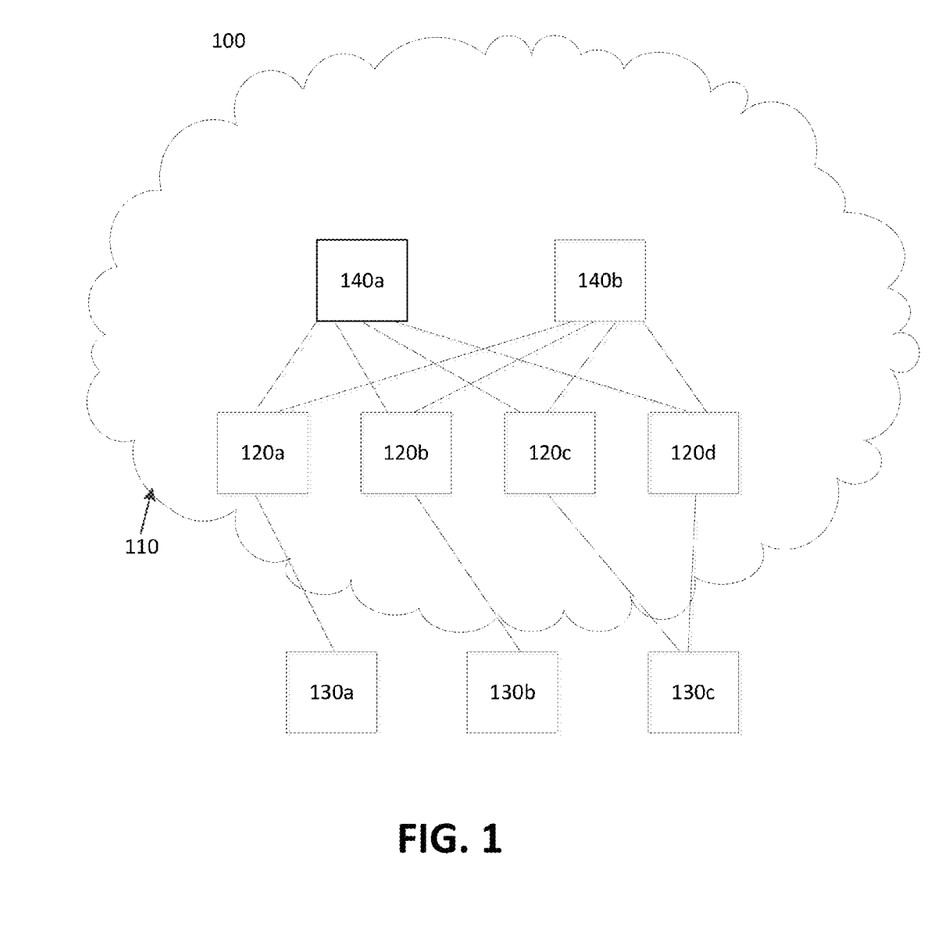
FIG. 1 illustrates a fabric network in which embodiments of the present disclosure may be employed.

Embodiments of the present disclosure may be utilized on a fabric network, such as fabric network 100 as illustrated in FIG. 1. Fabrics, such as fabric 110 may consist of an underlay and an overlay. The underlay may deal with the connectivity between network devices, such as network devices 140a and 140b, within fabric 110. The overlay may deal with traffic entering fabric 110. Most fabrics, such as fabric 110, may be generally capable of L2 and Layer-3 (L3) services on top of the underlay.

Traffic may enter fabric 110 through fabric edge nodes, such as fabric edge nodes 120a, 120b, 120c, and 120d. Fabric edge nodes may be responsible for encapsulating each data packet with a fabric header. In embodiments of the present disclosure, the fabric header may contain at least an egress fabric node address.

When a data packet arrives at an egress fabric node corresponding with the egress fabric node address contained in its fabric header, the packet header may be stripped from the packet. The egress fabric node may subsequently forward the now-native packet according to an inner address contained in the native packet header.

Fabric network 100 may further comprise a number of classical L2 switches, such as L2 switches 130a, 130b, and 130c. L2 switch 130a and L2 switch 130b may be connected to fabric 110 through a single fabric edge node (fabric edge node 120a and fabric edge node 120b respectively). On the other hand, L2 switch 130c may be connected in a dual-homed manner between fabric edge node 120c and fabric edge node 120d. Fabric edge node 120c and fabric edge node 120d may collaborate to form a multi-chassis Etherchannel group.

By employing such a multi-chassis Etherchannel group, L2 switch 130c may operate as if it considers itself to be attached to a port-channel terminating on a single upstream system (in this case, fabric 110). Embodiments of the present disclosure described below describe how to make classical L2 switches, such as L2 switch 130c appear to be part of fabric 110 to the other edge nodes in fabric 110, such as fabric edge nodes 120a, 120b, 120c, and 120d.

In some embodiments of the present disclosure, a virtual IP address may be assigned to each of L2 switch 130a, L2 switch 130b, and L2 switch 130c. For example, L2 switch 130a may be assigned a virtual IP address of 192.168.1.1, L2 switch 130b may be assigned a virtual IP address of 192.168.1.2, and L3 switch 130c may be assigned a virtual IP address of 192.168.1.3.

Next, the assigned virtual IP addresses may be announced to outside network devices. In some embodiments, this may be achieved by employing the Interior Gateway Protocol (IGP). For example, fabric edge node 120a may announce the virtual IP address assigned to L2 switch 130a in the underlay IGP. Fabric edge node 120b may announce the virtual IP address assigned to L2 switch 130*b* in the underlay IGP. Fabric edge node 120*c* and fabric edge node 120*d* may both announce the virtual IP address assigned to L2 switch 130*c* in the underlay IGP. Once the announcements occur, all other network devices in fabric 110 will learn appropriate paths to reach the virtual extended switches.

In some embodiments, packets travelling the interface connected between fabric edge node 120*a* and L2 switch 130*a* may be encapsulated by fabric edge node 120*a*. The encapsulation may include a fabric overlay source IP address and the virtual IP address assigned to L2 switch 130*a*. Similarly, packets travelling the interface connected between fabric edge node 120*b* and L2 switch 130*b* may be encapsulated by fabric edge node 120*b*. The encapsulation may include the fabric overlay source IP address and the virtual IP address assigned to L2 switch 130*b*.

In some embodiments, packets travelling the interface connected between fabric edge node 120*c* or fabric edge node 120*d* and L2 switch 130*c* may be encapsulated by fabric edge node 120*c* or fabric edge node 120*d* respectively. The encapsulation may include a fabric overlay source IP address and the virtual IP address assigned to L2 switch 130*c*. L2 switch 130*c* may operate to load balance traffic over the links connecting to fabric edge node 120*c* and fabric edge node 120*d*.

Figure 2:
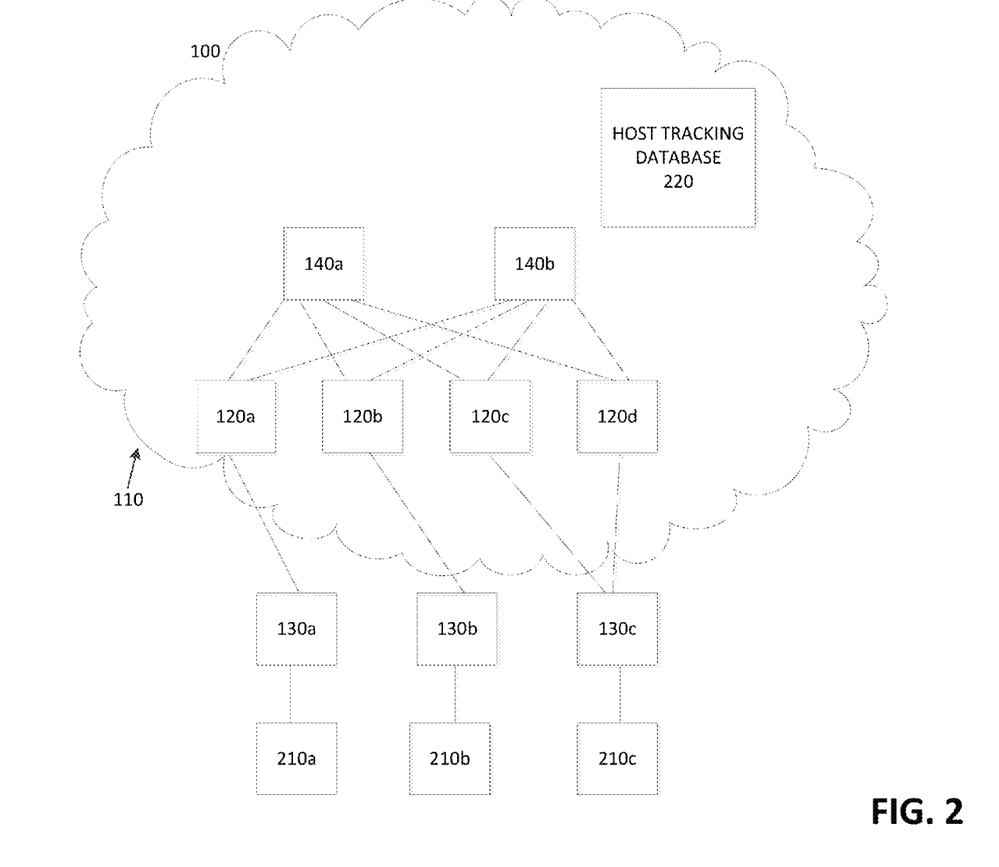
FIG. 2 illustrates a fabric network in which embodiments of the present disclosure may be employed.

At this point, all network devices may identify L2 switch 130*a*, L2 switch 130*b*, and L2 switch 130*c* as part of fabric 110. As such, packets may be sent destined to hosts, such as host 210*a*, 210*b*, and 210*c* as illustrated in FIG. 2 connected on any of L2 switch 130*a*, L2 switch 130*b*, and L2 switch 130*c*. The packets may use an outer destination address containing the virtual IP address of L2 switch 130*a*, L2 switch 130*b*, and L2 switch 130*c* respectively.

Now a respective fabric edge node of fabric edge nodes 120*a*, 120*b*, 120*c*, and 120*d* may decapsulate the received packets and may forward the decapsulated packets on interfaces connected to L2 switch 130*a*, L2 switch 130*b*, and L2 switch 130*c* respectively. This allows embodiments of the present disclosure the ability to avoid an inner destination lookup. This in turn, may avoid typically required synching of local hosts between the peer switch network devices.

In some embodiments of the present disclosure, fabric edge nodes 120*a*, 120*b*, 120*c*, and 120*d* may register endpoints (i.e., host 210*a*, 210*b*, and 210*c*) once they are detected on the links connected to L2 switch 130*a*, L2 switch 130*b*, and L2 switch 130*c*. In some embodiments, this registry may be in the form of a host tracking database 220. Now, from the perspective of L2 switch 130*a*, L2 switch 130*b*, and L2 switch 130*c* (which are dually homed to fabric 110), the up-link appears to be a port-channel. This implies that the code for a classical L2 switch would not need to be modified to support present embodiments of virtual fabric expansion.

Figure 3:
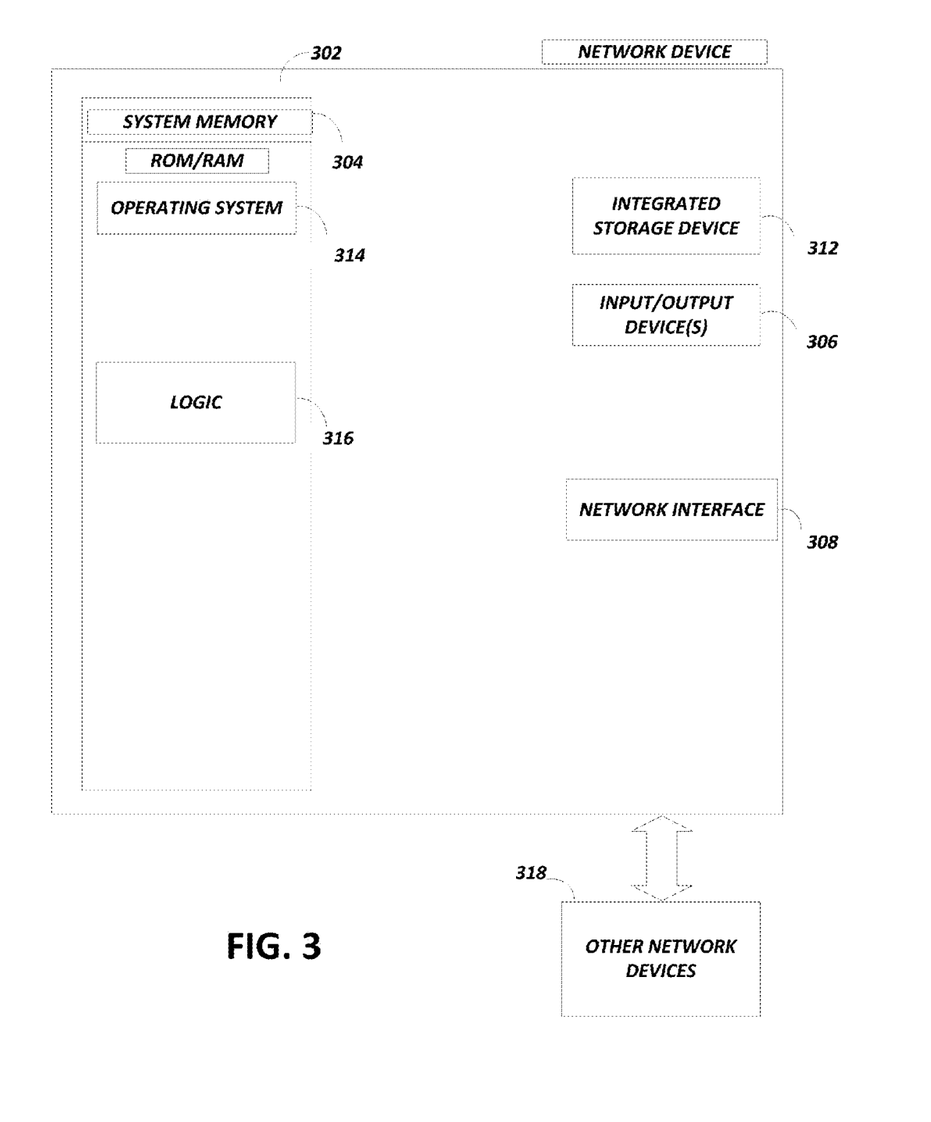
FIG. 3 is a system diagram of a network device operable with embodiments of the present disclosure.

FIG. 3 shows a network device, such as a router, switch, fabric edge device, or any other network device that may employ embodiments of the present disclosure in greater detail. The network device may include at least a processing device 302, a memory 304, input/output (I/O) devices 306, and a network interface 308, each of which is communicatively coupled via a local interface 310. The MAC tables may be located within memory 304. Processing device 302 may be a hardware device for executing software, particularly that which is stored in memory 304. Processing device 302 may be any custom made or commercially available processor, a central processing unit (CPU), an auxiliary processor among several processors associated with a content server, a semiconductor-based microprocessor (in the form of a microchip or chip set), a microprocessor, or generally any device for executing software instructions. The forwarding engine may be implemented by processing device 302.

I/O devices 306 may include input devices, for example but not limited to, a keyboard, mouse, scanner, microphone, etc. Furthermore, the I/O devices 306 may also include output devices, for example but not limited to, a printer, display, etc.

Network interface 308 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

Local interface 310 may be, for example but not limited to, one or more buses or other wired or wireless connections. Local interface 310 may have additional elements, which are omitted for simplicity, such as controllers, buffers (caches), drivers, repeaters, and receivers, to enable communications. Further, local interface 310 may include address, control, and/or data connections to enable appropriate communications among the aforementioned components and provides the interface to communicate with processing device 302.

In some embodiments, the network device may further be configured with an integrated storage device 312 coupled to local interface 310. Storage device 312 may be configured to store a plurality of content chunks. In some embodiments, storage device 312 may be used for storage of one or more MAC tables or mapping tables.

Memory 304 may include a suitable operating system (O/S) 314. Operating system 314 essentially may control the execution of other computer programs, such as scheduling, input-output control, file and data management, memory management, and communication control and related services. Logic 316 may include executable code to send TLVs to other network devices.

Memory 304 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 304 may incorporate electronic, magnetic, optical, semi-conductive, and/or other types of storage media. Note that memory 304 may have a distributed architecture, where various components are situated remotely from one another, which can be accessed by the processing device 302.

The software in memory 304 may include one or more separate programs, each of which comprises an ordered listing of executable instructions for implementing logical functions. In the embodiment shown, the software in memory 304 may include operating system 314 and logic 316, as explained above. Functionality of logic 316 may be implemented using a single module, or distributed among a plurality of modules.

When logic 316 is in operation, processing device 302 may be configured to execute logic 316 stored within memory 304, to communicate data to and from memory 304, and to generally control operations of logic 316. Logic 316 and O/S 314, in whole or in part, but typically the latter, are read by processing device 302, perhaps buffered within processing device 302, and then executed.

The network device may include a communication interface suitable for enabling communication (e.g., TCP/IP) with other network devices, and for receiving and processing forwarding requests to provide overlay communication services to a switch. For instance, communication interface may be of a type suitable for communication over an IP network, a coaxial cable network, an HFC network, and/or wireless network, among others.

A communications port (or ports) may further be included in the network device for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.).

Figure 4:
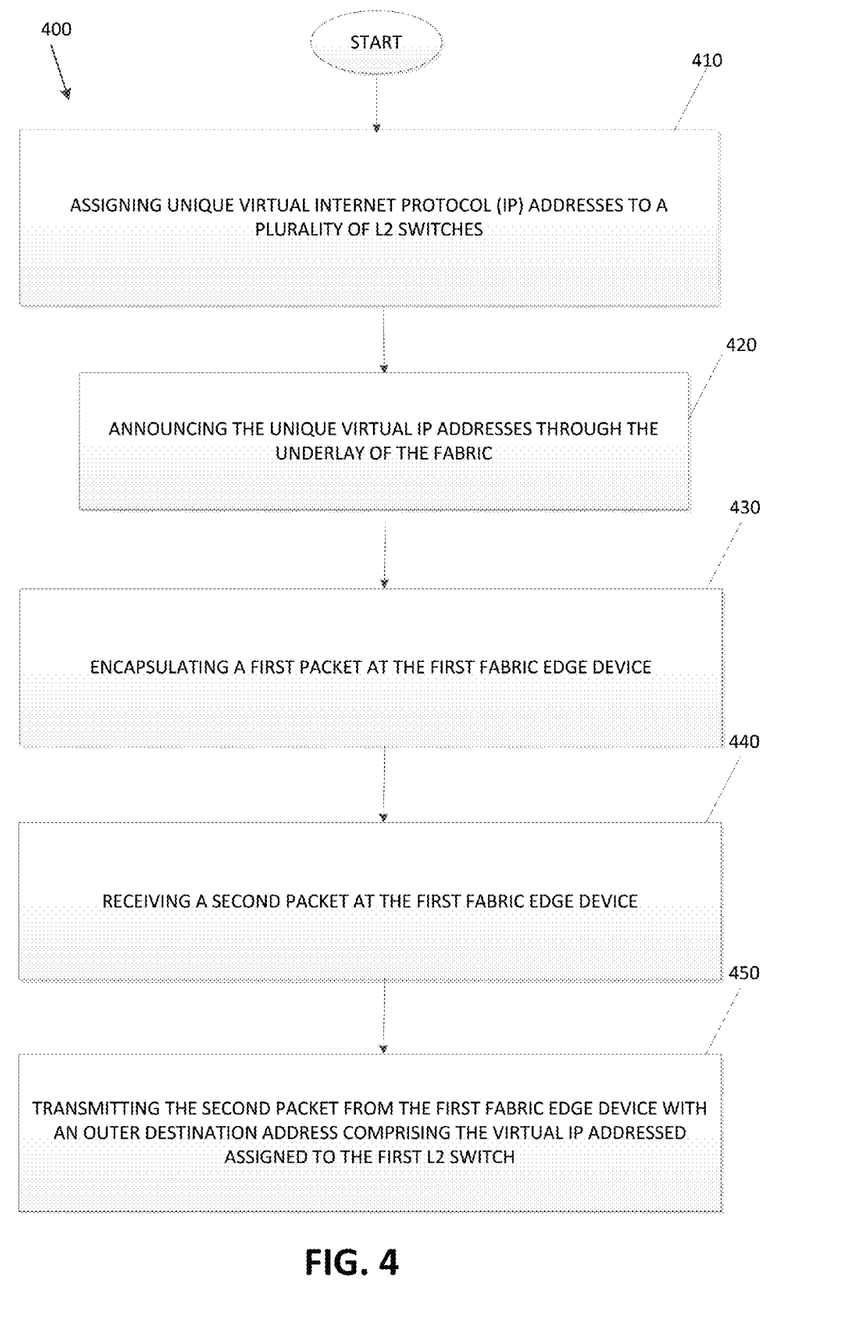
FIG. 4 is a flow chart illustrating embodiments of the present disclosure.

FIG. 4 is a flow chart illustrating certain embodiments of the present disclosure. Method 400 may begin at step 410 where unique virtual Internet Protocol (IP) addresses may be assigned to a plurality of L2 switches. The L2 switches may be located outside of a fabric containing any number of interconnected network devices. In some embodiments of the present disclosure, the L2 switches may be connected to one or more fabric edge devices in the fabric.

Method 400 may then proceed to step 420. At step 420, the unique virtual IP addresses may be announced through the underlay of the fabric. For example, a first fabric edge device may be in communication with a first L2 switch outside of the fabric edge device's fabric. Upon the assigning of a virtual IP address for the first L2 switch, the first fabric edge device may be responsible for announcing the assigned virtual IP address. In some embodiments of the present disclosure, the unique virtual IP addresses may be announced through Interior Gateway Protocol (IGP). In some embodiments of the present disclosure, the first L2 switch may be registered in a host tracking database. For example, the host tracking database may store at least an identifier associated with the first L2 switch and the virtual IP addressed assigned to the first L2 switch.

Next, method 400 may proceed to step 430 where a first packet may be encapsulated at the first fabric edge device. In some embodiments of the present disclosure, the first packet is encapsulated with at least a unique virtual IP address assigned to a first L2 switch of the plurality of L2 switches, wherein the first L2 switch and the first fabric edge device are connected to one another over an interface.

In some embodiments of the present disclosure, method 400 may proceed to step 440. At step 440 a second packet may be received at the first fabric edge device. For example, the second packet may be destined to a host connected to the first L2 switch. In some embodiments of the present disclosure, the second packet may be decapsulated at the first fabric edge device. Subsequently, at step 450, the second packet may be transmitted from the first fabric edge device with an outer destination address comprising the virtual IP addressed assigned to the first L2 switch.

Figure 5:
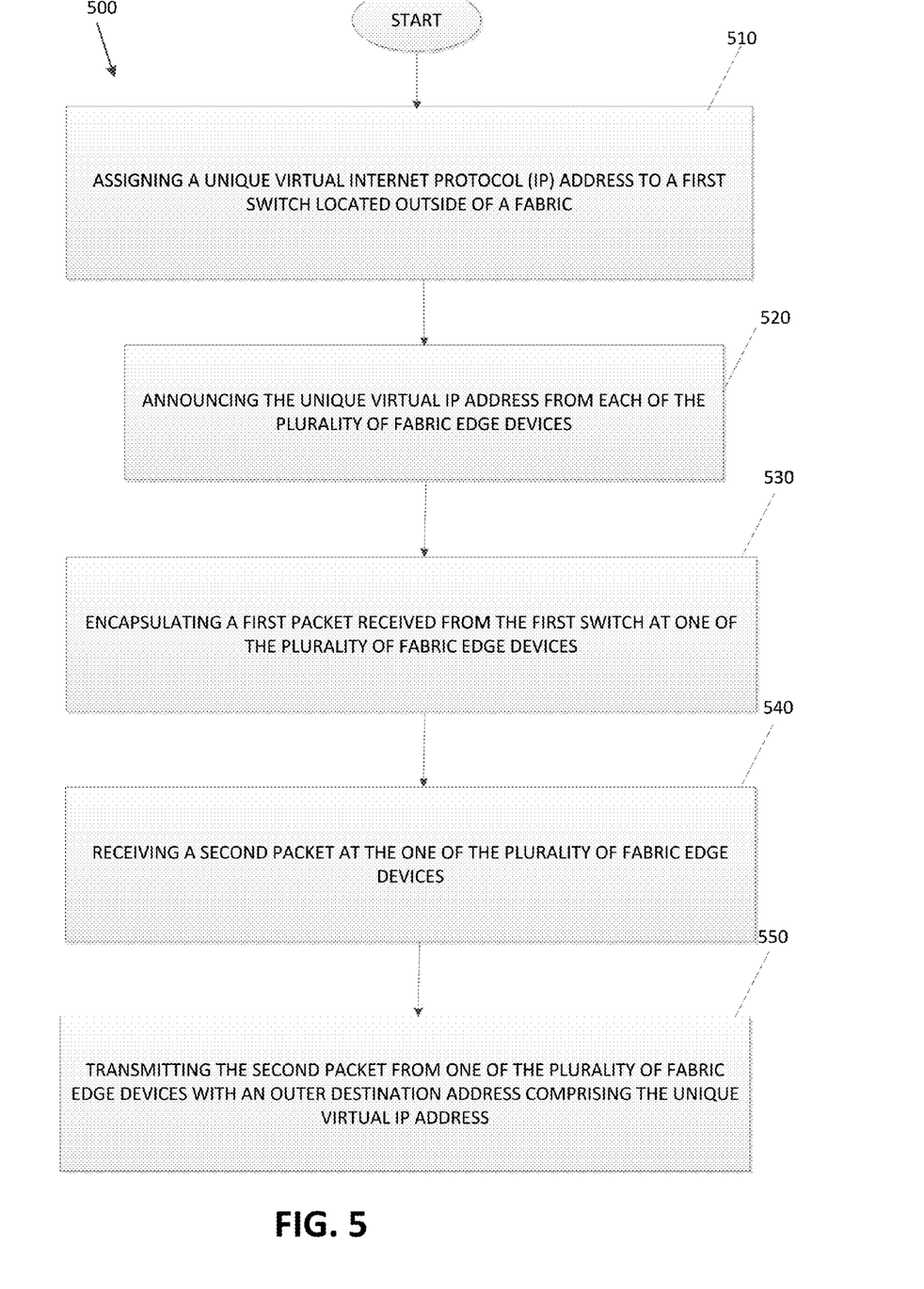
FIG. 5 is a flow chart illustrating embodiments of the present disclosure.

FIG. 5 is a flow chart illustrating certain embodiments of the present disclosure. Method 500 may start at step 510 where a unique virtual Internet Protocol (IP) address may be assigned to a first switch located outside of a fabric. Furthermore, the first switch may be connected to a plurality of fabric edge devices inside the same fabric.

Next, method 500 may proceed to step 520. At step 520, the unique virtual IP address may be announced from each of the plurality of fabric edge devices. For example, fabric edge devices 120c and 120d may be responsible for announcing the virtual IP address of classical L2 switch 130c due to their respective interface connections. In some embodiments of the present disclosure, fabric edge devices 120c and 120d may be formed as a multi-chassis Ethernet group.

Method 500 may subsequently proceed to step 530 where a first packet received from the first switch may be encapsulated at one of the plurality of fabric edge devices. The first packet may be encapsulated with at least the unique virtual IP address. In some embodiments of the present disclosure, a particular fabric edge device may be selected for encapsulating the first packet based on one or more load balancing rules.

Method 500 may next proceed to step 540, where a second packet may be received at the one of the plurality of fabric edge devices. For example, the second packet may be destined to a host connected to the first switch. Subsequent to receipt of the second packet, method 500 may proceed to step 550. At step 550, the second packet may be transmitted from one of the plurality of fabric edge devices with an outer destination address comprising the unique virtual IP address. In some embodiments of the present disclosure, an identifier associated with the first switch and the respective unique virtual IP address may be stored in a database.

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit embodiments to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
   assigning unique virtual Internet Protocol (IP) addresses to a plurality of L2 switches, wherein the plurality of L2 switches are connected to one or more fabric edge devices in a fabric, and wherein the plurality of L2 switches are located outside of the fabric;
   announcing the unique virtual IP addresses in an underlay of the fabric;
   encapsulating a first packet at a first fabric edge device of the one or more fabric edge devices, wherein the first packet is encapsulated with at least a unique virtual IP address assigned to a first L2 switch of the plurality of L2 switches, wherein the first L2 switch and the first fabric edge device are connected over an interface; and
   registering the first L2 switch in a host tracking database wherein the host tracking database stores at least an identifier associated with the first L2 switch and the virtual IP address assigned to the first L2 switch.

2. The method of claim 1, wherein the unique virtual IP addresses are announced through Interior Gateway Protocol (IGP).

3. The method of claim 1, wherein the unique virtual IP addresses are announced by the one or more fabric edge devices.

4. The method of claim 1, further comprising:
   receiving a second packet at the first fabric edge device, wherein the second packet is destined to a host connected to the first L2 switch; and
   transmitting the second packet from the first fabric edge device with an outer destination address comprising the virtual IP addressed assigned to the first L2 switch.

5. The method of claim 4, further comprising decapsulating the second packet at the first fabric edge device prior to transmitting the second packet.

6. A method comprising:
   assigning an unique virtual Internet Protocol (IP) address to a first switch located outside of a fabric, wherein the first switch is connected to a plurality of fabric edge devices inside the fabric;
   announcing the unique virtual IP address from each of the plurality of fabric edge devices;
   encapsulating a first packet at one of the plurality of fabric edge devices with at least the unique virtual IP address, wherein the first packet was received from the first switch;
   receiving a second packet at the one of the plurality of fabric edge devices, wherein the second packet is destined to a host connected to the first switch; and
   transmitting the second packet from one of the plurality of fabric edge devices with an outer destination address comprising the unique virtual IP address.

7. The method of claim 6, further comprising selecting the one of the plurality of fabric edge devices for encapsulating the first packet based on one or more load balancing rules.

8. The method of claim 6, further comprising forming the plurality of fabric edge devices as a multi-chassis Ethernet group.

9. The method of claim 6, wherein the first switch is a classical L2 switch.

10. The method of claim 6, further comprising storing at least an identifier associated with the first switch and the unique virtual IP address in a database.

11. A system comprising:
    a memory; and
    a processor configured to execute instructions stored in the memory, the instructions comprising:
      assigning unique virtual Internet Protocol (IP) addresses to a plurality of L2 switches, wherein the plurality of L2 switches are connected to one or more fabric edge devices in a fabric, and wherein the plurality of L2 switches are located outside of the fabric;
      announcing the unique virtual IP addresses in an underlay of the fabric; and
      encapsulating a first packet at a first fabric edge device of the one or more fabric edge devices, wherein the first packet is encapsulated with at least a unique virtual IP address assigned to a first L2 switch of the plurality of L2 switches, wherein the first L2 switch and the first fabric edge device are connected over an interface wherein the unique virtual IP address assigned to the first L2 switch is announced through Interior Gateway Protocol (IGP).

12. The system of claim 11, wherein the processor is further configured to execute instructions comprising: forming the one or more fabric edge devices as a multi-chassis Ethernet group.

13. The system of claim 11, wherein the processor is further configured to execute instructions comprising:
    receiving a second packet at the first fabric edge device, wherein the second packet is destined to a host connected to the first L2 switch; and
    transmitting the second packet from the first fabric edge device with an outer destination address comprising the unique virtual IP address.

14. The system of claim 13, wherein the processor is further configured to execute instructions comprising decapsulating the second packet at the first fabric edge device prior to transmitting the second packet.

15. The system of claim 13, further comprising a host tracking database configured to store at least an identifier associated with the first L2 switch and the unique virtual IP address.

16. The system of claim 11, wherein the unique virtual IP address assigned to the first L2 switch is announced by the first fabric edge device.

* * * * *